United States Patent

Slivar

[11] Patent Number: 6,035,518
[45] Date of Patent: Mar. 14, 2000

[54] METHOD FOR PREPARING A CYLINDRICAL SEPARATOR, A TOOL USABLE FOR THE METHOD AND A CYLINDRICAL CELL WITH THE SEPARATOR

[75] Inventor: Djuro Slivar, Sharon, Canada

[73] Assignee: Battery Technologies Inc., Richmond Hill, Canada

[21] Appl. No.: 09/068,392

[22] PCT Filed: Nov. 4, 1996

[86] PCT No.: PCT/IB96/01178

§ 371 Date: Feb. 5, 1999

§ 102(e) Date: Feb. 5, 1999

[87] PCT Pub. No.: WO97/17736

PCT Pub. Date: May 15, 1997

[30]     Foreign Application Priority Data

Nov. 10, 1995 [HU] Hungary ................................. 9503225

[51] Int. Cl.[7] .............................. H01M 6/00; B23P 19/00; B05D 3/00; B05C 13/00; C25B 11/00
[52] U.S. Cl. .......................... 29/592.1; 29/623.2; 29/731; 29/743; 427/296; 118/500; 204/260
[58] Field of Search .................................. 29/623.1, 592.1, 29/623.2, 730–731, 743; 427/68, 294, 296; 118/50, 500; 204/260

[56]             References Cited

U.S. PATENT DOCUMENTS

| | | |
|---|---|---|
| 3,829,952 | 8/1974 | Trask . |
| 4,064,288 | 12/1977 | Shah et al. ........................... 427/296 X |
| 4,361,475 | 11/1982 | Moeglich ............................. 204/260 X |
| 4,574,472 | 3/1986 | Epstein et al. . |
| 4,618,546 | 10/1986 | Simonton et al. . |
| 5,075,958 | 12/1991 | Kelemen et al. ................... 29/623.2 X |
| 5,154,731 | 10/1992 | Winger ....................................... 29/731 |
| 5,192,585 | 3/1993 | Inokuti et al. ....................... 427/295 X |
| 5,660,882 | 8/1997 | McBride et al. ..................... 427/296 X |

FOREIGN PATENT DOCUMENTS

| | | |
|---|---|---|
| 669479 | 3/1989 | Switzerland . |
| 2181594 | 4/1987 | United Kingdom . |
| 2259601 | 3/1993 | United Kingdom . |

*Primary Examiner*—Donald R. Valentine
*Attorney, Agent, or Firm*—Santosh K. Chari; Orange Chari Pillay

[57]             ABSTRACT

A method for preparing a cylindrical separator from sheet material and for inserting the separator in the cylindrical anode space of a semi-finished cell, in which the separator is wound from a sheet material around a mandrel to have a diameter smaller than the diameter of the anode space so that the sheet is temporarily affixed to the outer surface of the mandrel by providing vacuum through the mandrel wall, and the so obtained winding is inserted axially in the cathode cylinder. When the insertion is ready, the vacuum is disrupted, and the wound structure expands and presses against the cathode wall. In a preferable embodiment a rotating cylindrical spindle is used to feed the sheet material to the mandrel so that the spindle comprises a hollow interior connected to a vacuum pump and comprises a plurality of bores communicating with the hollow interior, and the sheet material is fed to a zone of the spindle where it will be affixed thereto by means of the sucking force through the bores, the spindle transports the sheet material to the zone of the mandrel, where a stationary center in the hollow interior of the spindle closes the path of the vacuum to the bore, whereby the sheet material will depart from the spindle surface and will be guided to the mandrel. The tool is capable of carrying out the method and the cell comprises the cylindrical separator made by the method.

9 Claims, 2 Drawing Sheets

METHOD FOR PREPARING A CYLINDRICAL SEPARATOR, A TOOL USABLE FOR THE METHOD AND A CYLINDRICAL CELL WITH THE SEPARATOR

The invention relates to cylindrical cells of the type that comprises a cylindrical cathode with a hollow interior, an anode arranged coaxially in the interior, and a separator winding that separates the anode from the cathode. More particularly, in a first aspect the invention relates to a method for preparing a cylindrical separator from sheet material and for inserting the separator in the cylindrical anode space of a semi-finished cell. In a second aspect the invention relates to a tool for preparing a cylindrical separator from a sheet material and for inserting the separator in the cylindrical anode space of a semi-finished cell. In a third aspect the invention relates to a cylindrical cell with a cylindrical separator between the anode and the cathode. The cell is preferably an alkaline primary or secondary cell.

In cylindrical cells, in which the electrodes are arranged coaxially around each other, the separator takes the form of a thin upright cylinder often closed at the bottom. The closure of the bottom end requires folding of the separator material which is connected with wrinkling of the materials, and special measures have to be taken to overcome such difficulties.

In Swiss patent No. 669.479 issued to Ruetschi a multi layer separator cylinder was used, which was inserted in the cell as a distinct product. The required insulation between the cell can and the anode space was provided by the application of a sealant. In one of the embodiments the separator took the form of an upright cylinder open at both ends, and the open bottom portion was closed by a polymer washer and a sealant material.

In the Hungarian patent application 4046/91 published under publication number T/67990 the separator was again an upright cylinder open at both ends, and the required insulation at the cell bottom was solved by the specific application of a sealant.

The Hungarian patent application 4044/91 published under publication number T/67993 describes a separator structure which is a thin cylinder open at both ends wound from a fibrous layer and a non-fibrous microporous layer, in which the microporous layer overlaps the first layer to close the passage of dendrite growth at the edge region of the wrap.

In these prior publications the distinct separator cylinder must be inserted in the hollow interior of the cathode. The insertion of a vulnerable thin structure of minimum rigidity is a difficult step to perform, the separator cylinder must be guided and perfectly aligned with the central axis of the cell during the insertion step. The easy insertion requires that the diameter of the separator cylinder be smaller than the diameter of the central opening of the cathode, and the required gap provides a loss of volume in the cell. One of the most significant problems connected with the incorrect insertion of the separator cylinder is the hazard of contamination of the interior of the separator with the cathode material. Such contamination can be critical in mercury free alkaline cells regarding the increased danger of gas evolution.

The primary object of the invention is to provide a cylindrical separator that can be easily made and inserted in the cell, which can fully utilize available space and get pressed to the interior of the cathode.

A further object of the invention is to provide a tool which is capable of carrying out the method.

A still further object is to provide a cell, in which the separator fits more snugly in the available space.

According to the invention it has be recognized that the separator can be wound from a sheet material around a mandrel to have a diameter smaller than the diameter of the cathode so that the sheet is temporarily affixed to the outer surface of the mandrel by providing vacuum through the mandrel wall, and the so obtained winding can be inserted axially in the cathode cylinder. When the insertion is ready, the vacuum can be disrupted, and the wound structure will expand and fill the available space.

In a preferable embodiment a rotating cylindrical spindle can be used to feed the sheet material to the mandrel so that the spindle comprises a hollow interior connected to a vacuum pump and comprises a plurality of bores communicating with the hollow interior, and the sheet material is fed to a zone of the spindle where it will be affixed thereto by means of the sucking force through the bores, the spindle transports the sheet material to the zone of the mandrel, where a stationary center in the hollow interior of the spindle closes the path of the vacuum to the bore, whereby the sheet material will depart from the spindle surface and will be guided to the mandrel.

Cutter rollers can be provided to cut the sheet material to a size that corresponds to the required number of turns in the separator winding.

The cells which comprise a separator cylinder made according to the invention will differ from those with conventional separator cylinder in that the wound structure when released in the final place expands and presses against the inner wall of the cathode. The space utilization will thereby improve and the hazard of manufacturing errors during insertion of the separator will be reduced to minimum.

With the tools made according to the invention the separator manufacturing and assembly station will fit in a continuous cell assembly manufacturing line, which increases efficiency of production to a considerable extent.

BRIEF DESCRIPTION OF THE DRAWINGS

The invention will now be described in connection with preferable embodiments thereof, in which reference will be made to the accompanying drawings. In the drawing.

Figure 1:
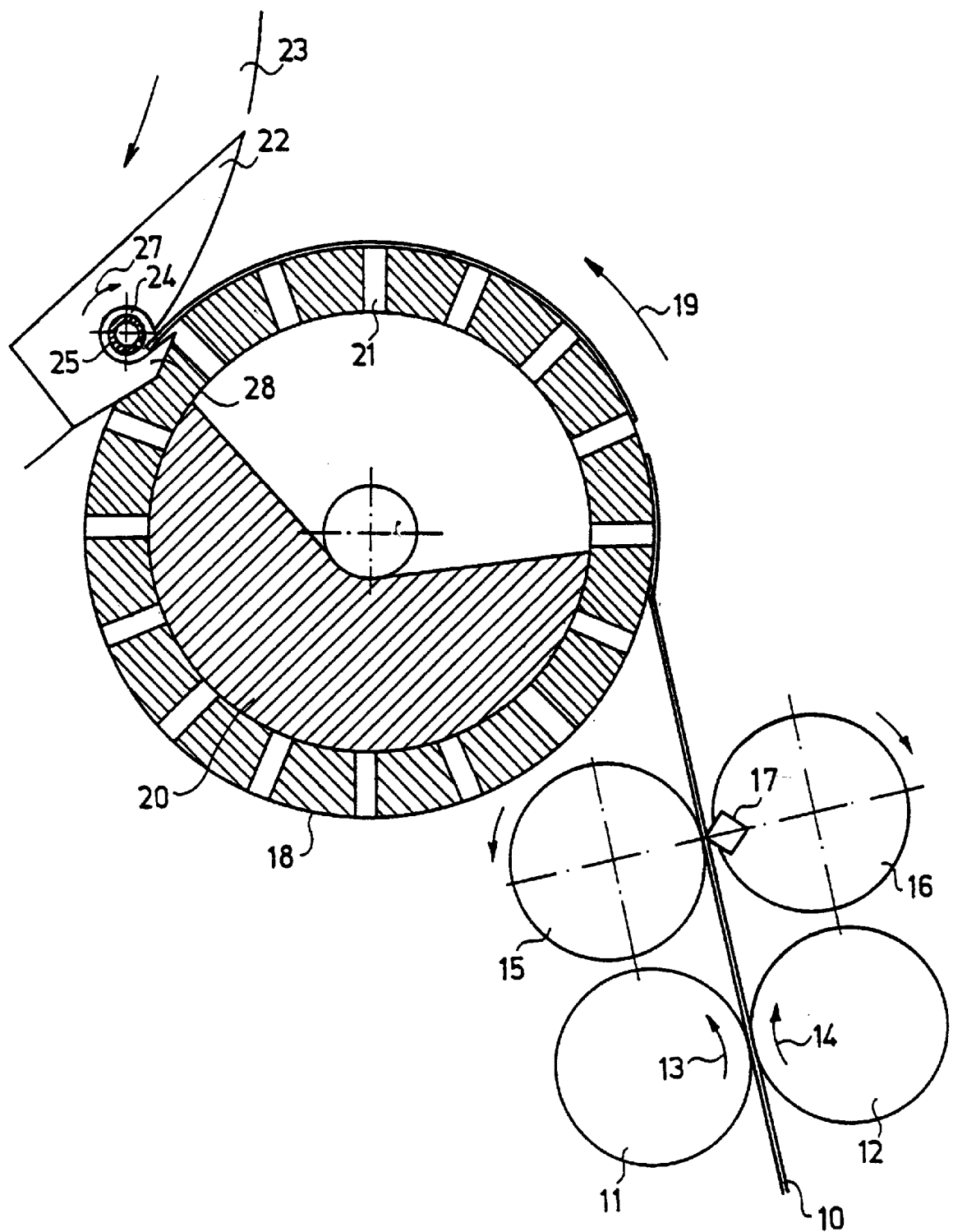
FIG. 1 is the schematic top view of a separator manufacturing station, partially in section.

The path of the sheet material 10 extends between a pair of counter-rotating cutting rollers 15, 16. The roller 15 is a cylinder and acts as an anvil, while the roller 16 is spaced from the path of the sheet 10 and a cutter prism 17 with a cutting edge is attached to the roller 16. Once in each revolution of the rollers 15, 16 the position shown in FIG. 1 is reached, in which the cutting edge presses against the anvil, and the sheet material gets cut along the edge. The sheet material 10 proceeds in forward direction and reaches the periphery of a vacuum spindle 18 rotating in the direction of arrow 19.

The vacuum spindle 18 has a stationary center 20 with a partially hollow cross section shown in FIG. 1, and vacuum is provided in the hollow inner space defined between the interior of the spindle 18 and the center 20. A plurality of bores 21 are provided in the wall of the vacuum spindle 18. When the sheet material 10 reaches the periphery of the vacuum spindle 18, the vacuum through the first of the bores 21 will temporarily fasten the material to the spindle by means of the sucking force, and the cut piece of sheet material will be transported till a zone of engagement with a winding nest 22.

The winding nest 22 is preferably attached to the rotor 23 of a station of an assembly line revolving with a speed that allows the completion of a manufacturing step while the winding nest 22 is substantially in the engagement zone with the vacuum spindle 18. The rotor 23 is schematically illustrated by a short section of a circle.

Figure 2:
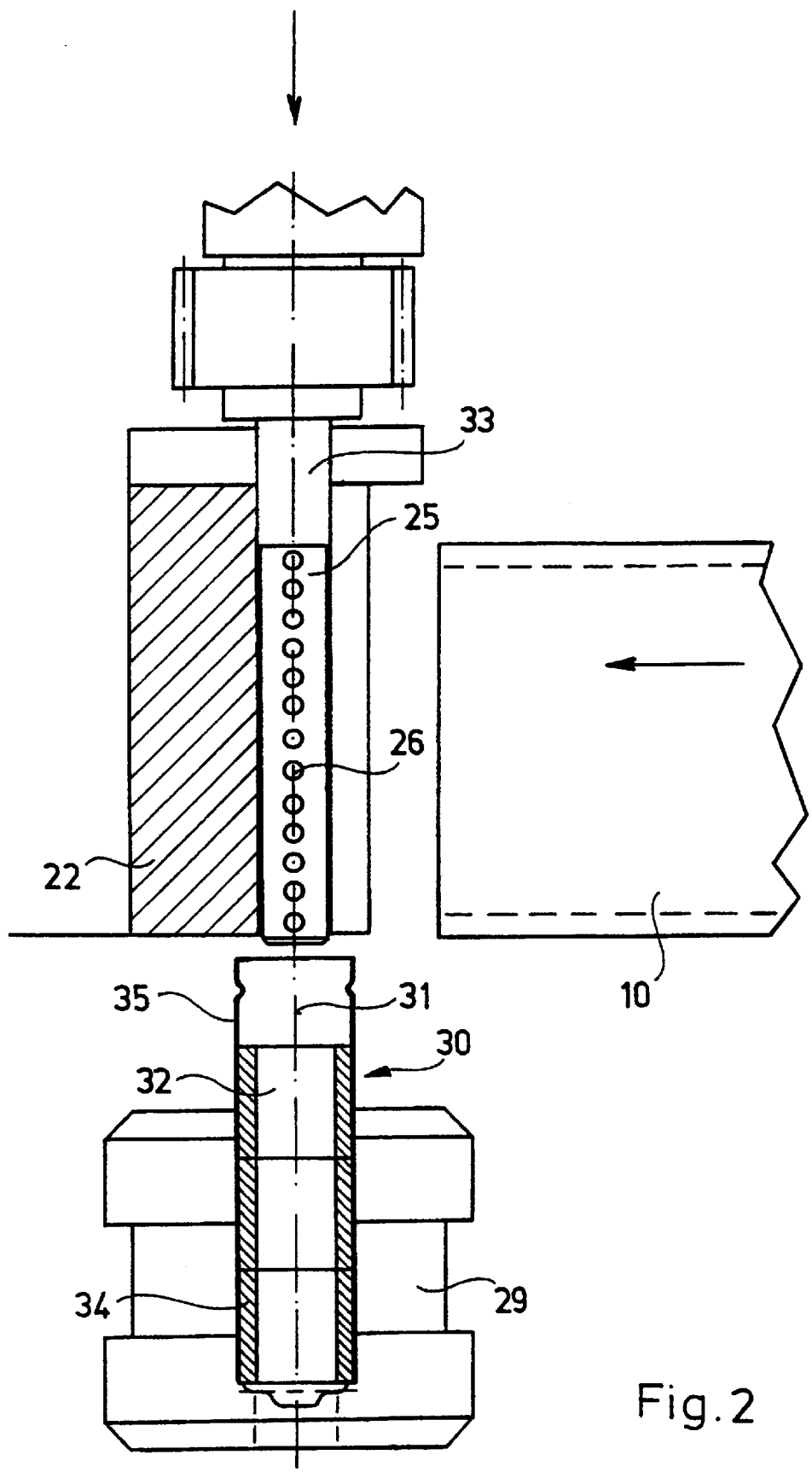
FIG. 2 is the schematic sectional elevation view of the station In the arrangement shown in FIG. 1 a separator sheet material 10 is pulled down from a reel (not shown) by means of a pair of feed rollers 11, 12 rotating in opposite directions as shown by arrows 13, 14. The sheet material 10 is preferably a laminate comprising a fibrous, porous material and a cellulose layer.

The winding nest 22 defines a cylindrical bore 24 with a narrow mouth section for the insertion of the sheet material 10. A cylindrical mandrel 25 extends coaxially in the bore 24 and it is provided with openings 26 arranged in a vertical line below one another as shown in FIG. 2. The mandrel 25 has a hollow interior which is connected to a vacuum pump (not shown). A ring-like guiding channel is formed in the bore 24 around the mandrel 25. The mandrel 25 is rotated in the direction shown by arrow 27.

The dashed lines in FIG. 2 just inwardly from the edges of the sheet 10 illustrate the edges of the vacuum spindle 18 which is slightly narrower than the sheet material 10. The winding nest 22 has projections (FIG. 1) in the upper and lower edge zones that guide the sheet material in the bore 24 of the winding nest 20. Just when the edge zone of the sheet 10 has entered the mouth opening of the winding nest 22, the internal opening of the foremost bore 21 reaches the stationary center 20 that separates the bore from the vacuum space, and the frontal zone of the sheet 10 will no longer be forced to follow the vacuum spindle 18. The effect of the vacuum through the openings 26 of the mandrel 25 affixes the frontal zone of the sheet material 10 to the periphery of the mandrel 25 when this zone has entered the guiding channel through the mouth opening of the bore 24. The speed of rotation of the mandrel 25 can be selected in such a way that the peripheral speed of the mandrel 25 is slightly higher than the peripheral speed of the vacuum spindle 18, whereby the cut sheet material is always exposed to slight stretching forces.

The rotating mandrel 25 will wind up the cut section of the sheet material 10 fed by the vacuum spindle 18. The length of the cut section corresponds to the required number of turns of the separator sheet in the separator cylinder for the cell under manufacture. Generally, the number of turns is between 2 and 3.

In the sectional elevation view of FIG. 2 it can be seen that the winding nest 22 is arranged just above a cell support member 29, in which a semi-finished cell 30 under manufacture is inserted so that the center line 31 of the cell is in the extension of the center line of the mandrel 25. The diameter of the bore 24 around the mandrel 25 is smaller than the diameter of the anode space 32 in the cell 30 in which the separator must be inserted.

When the whole cut section of the sheet material 10 is wound around the mandrel 25, a piston 33 in the rotor of the assembly line is activated, and it pushes down the mandrel 25 with the separator winding around it in the anode space 32 of the cell 30. The anode space 32 is surrounded by cathode 34 of the cell 30, which is already assembled in a cylindrical metal can 35 when the semi-finished cell arrives in the separator insertion station of the assembly line.

In the lowest position when the lower edge of the separator winding abuts the lower end of the anode space 32, the piston 33 is stopped, the vacuum in the hollow interior of the mandrel 25 is switched off, whereby the sheet material will disengage the mandrel 25, and due to the resiliency of the sheet material the winding slightly expands and pushes against the cylindrical inner wall of the cathode 34. The piston 33 with the mandrel will now be pulled back to the original position, the vacuum is established again, and a new winding can be made.

The cell support member 29 will then be moved to the next station of the manufacturing line with the separator cylinder in place.

It is preferable, if in a subsequent step of the cell manufacturing process, prior to the insertion of the anode in the anode space, the bottom edge zone of the separator winding together with the bottom of the interior of the anode space 32 is sprayed with a hot melt material, which provides insulation between the anode space and the can, between the anode space and the cathode space at the bottom edge region, and finally stabilizes the position of the separator winding.

While the preparation of the separator winding has been demonstrated in connection with the use of a single sheet material 10 that can be a single layer or a laminate, it can be understood that a second pair of feeder rollers can also be arranged to supply a further sheet material to the periphery of the vacuum spindle 18. If the first sheet material has a porous structure, the vacuum through the bores 21 will be sufficient to fasten the second layer to the spindle 18 as well. The invention can not be limited to the use of a single sheet material.

From the above description it can be understood that the insertion of the separator winding in the anode space 32 occurs smoothly and without the hazard of being wrinkled or hurt. This phase of the manufacturing process is simple and can be designed for continuous operation that provides the highest degree of efficiency.

I claim:

1. A method for preparing a cylindrical separator from sheet material and for inserting the separator in the cylindrical anode space of a semi-finished cylindrical cell, in which said anode space has a predetermined diameter, comprising the steps of:

feeding a sheet separator material of predetermined length towards the surface of a cylindrical mandrel with a diameter smaller than said diameter of the anode space, said mandrel defining a hollow interior and provided with bores;

establishing a vacuum in said hollow interior of the mandrel to fasten said separator material to the surface of said mandrel by means of the sucking effect of the vacuum through said bores;

rotating said mandrel to wind up said separator material;

inserting the mandrel with said winding in said cylindrical anode space;

terminating said vacuum to disconnect said mandrel from said winding and to let said winding slightly expand and being stressed against the wall of said anode space; and withdrawing said mandrel.

2. The method as claimed in claim 1, further comprising the steps of guiding said sheet material around said mandrel by means of a cylindrical channel provided with a mouth opening.

3. The method as claimed in claim 1, comprising the steps of:

feeding said sheet material to the surface of a rotating member provided with holes that communicate with a vacuum space to fasten said sheet material to said surface, said rotating member is arranged so that a surface portion is very close to said mandrel;

disrupting said vacuum in those holes of said rotating member which arrive in said very close surface portion during said rotation movement to locally disengage said sheet from said member; and guiding said disengaged portion of said sheet to said mandrel.

4. The method as claimed in claim 3, wherein said mandrel is rotated to have a slightly higher peripheral speed compared to said rotating member to cause said sheet material being slightly stretched during said winding step.

5. A cylindrical cell (30) comprising a cylindrical cathode with a hollow interior, an anode arranged coaxially in said interior, and a separator winding separating said anode from said cathode made and inserted as claimed in claim 1, characterized by comprising a hot melt seal at the bottom zone of the separator applied prior to the insertion of the anode for insulating the bottom portion of the cathode space from the anode space.

6. A tool for preparing a cylindrical separator from a sheet material and for inserting the separator in the cylindrical anode space of a semi-finished cell said anode space having a predetermined diameter, said tool comprising:

a mandrel (25) made as a hollow cylinder with a diameter adapted to be less than the diameter of said cylindrical anode space, said mandrel (25) comprises bores (26) through the cylinder wall and has a central axis;

a feeding means for inserting a separator sheet material (10) of predetermined length to said mandrel (25) so that the sheet is fed substantially in parallel to said central axis;

a vacuum pump means communicating with the hollow interior of said mandrel (25), adapted to provide a vacuum for fastening said inserted sheet material (10) to said mandrel;

a cell support member (29) defining a cylindrical recess for receiving a semi-finished cell (30), said cylindrical recess is arranged with an axis lying in the extension line of said axis of said mandrel (25);

a piston means for pushing said winding in said cylindrical recess; and vacuum release means for separating said winding from said mandrel, said tool further comprising a rotating means coupled to said mandrel (25) for rotating said mandrel (25) and for winding said sheet material (10) around the mandrel (25) to form a winding with a predetermined number of turns; a guiding means (22) around said mandrel (25) defining a cylindrical channel around the mandrel (25) and a narrow mouth opening extending substantially in parallel with said axis, wherein said guiding means (22) comprises projection means (28) extending out from said mouth opening in the direction of the path of the fed sheet material (10) to direct said material (10) to said mouth opening.

7. The tool as claimed in claim 6, wherein said feeding means comprises:

a vacuum spindle (18) with an outer diameter substantially larger than that of said mandrel (25) and arranged in such a way that a first peripheral zone thereof is closely adjacent to said mouth opening, said spindle (18) has a hollow interior, bores (21) are defined in the spindle wall communicating with said hollow interior, said bores (21) being arranged in discrete angular locations, said spindle (18) being adapted for rotation in said feeding direction;

feeder rollers (11, 12) feeding said sheet (10) at a second peripheral zone arranged before said first zone;

a stationary center (20) arranged in the hollow interior of said spindle (18) for covering a substantial angular portion of the hollow interior, said angular portion starts at said first peripheral zone and ends before said second peripheral zone; and a vacuum pump means communicating with the hollow interior of said spindle to fasten said sheet material (10) by means of the sucking forces through said bores (21) to the rotating outer surface of said spindle (18) between the second and first zones.

8. The tool as claimed in claim 7, further comprising cutting means (15, 16) arranged across the path of the sheet material (10) between the feeder rollers (11, 12) and said second zone, for cutting sections from said sheet material (10) to the required length of said winding.

9. The tool as claimed in claim 7, wherein said spindle (18) is adapted to have a speed of rotation that is slower than that of said mandrel (25).

* * * * *